(12) United States Patent
Kusakabe

(10) Patent No.: US 6,809,485 B2
(45) Date of Patent: Oct. 26, 2004

(54) DRIVING DEVICE FOR OSCILLATORY ACTUATOR (75) Inventor: Hiromi Kusakabe, Kanagawa (JP)

(73) Assignees: Teikoku Tsushin Kogyo Co., Ltd., Kawasaki (JP); AC Technologies Co., Ltd., Kawasaki (JP)

(*) Notice: Subject to any disclaimer, the term of this patent is extended or adjusted under 35 U.S.C. 154(b) by 111 days.

(21) Appl. No.: 10/292,758

(22) Filed: Nov. 13, 2002

(65) Prior Publication Data

US 2003/0102828 A1 Jun. 5, 2003

(30) Foreign Application Priority Data

Nov. 13, 2001 (JP) ......................................... 2001/347147

(51) Int. Cl.[7] .............................................. H02K 33/16
(52) U.S. Cl. ..................... 318/119; 318/128; 318/503
(58) Field of Search ...................... 318/37, 114, 119, 318/128, 460, 503, 519, 686; 388/912, 922

(56) References Cited

U.S. PATENT DOCUMENTS 3,754,391 A * 8/1973 Fujita .......................... 368/159
3,859,781 A * 1/1975 Sauer .......................... 368/159
4,873,477 A * 10/1989 Hirotomi ..................... 318/603
6,133,701 A    10/2000 Göktürk et al.

FOREIGN PATENT DOCUMENTS

| JP | 8-275562   | 10/1996 |
| JP | 8-331826   | 12/1996 |
| JP | 11-146655  | 5/1999  |
| JP | 2000-1419  | 1/2000  |
| JP | 2001-128487| 5/2001  |

* cited by examiner

Primary Examiner—Bentsu Ro
(74) Attorney, Agent, or Firm—Wenderoth, Lind & Ponack, L.L.P.

(57) ABSTRACT

A driving device for an oscillatory actuator in which a FLL (Frequency Locked Loop) is employed for detecting an electromotive force generated in a driving coil resulting from mechanical oscillation during a period in which no driving current is supplied to the oscillatory actuator, and for controlling an oscillation frequency on the basis of a relative time ratio between positive and negative polarities of the electromotive force to thereby pull a driving frequency into a neighborhood of a self-resonance frequency of the oscillatory actuator.

13 Claims, 13 Drawing Sheets

DRIVING DEVICE FOR OSCILLATORY ACTUATOR

BACKGROUND OF THE INVENTION

The present invention relates to a driving device for an oscillatory actuator, including an oscillator, comprising a permanent magnet or an electromagnet, a stator comprising an electromagnet or a permanent magnet, and an elastic member that supports the oscillator. The present invention is particularly suited to use as a driving device for an oscillatory actuator for a vibrator used for a manner mode of a cellular phone.

Figure 13:
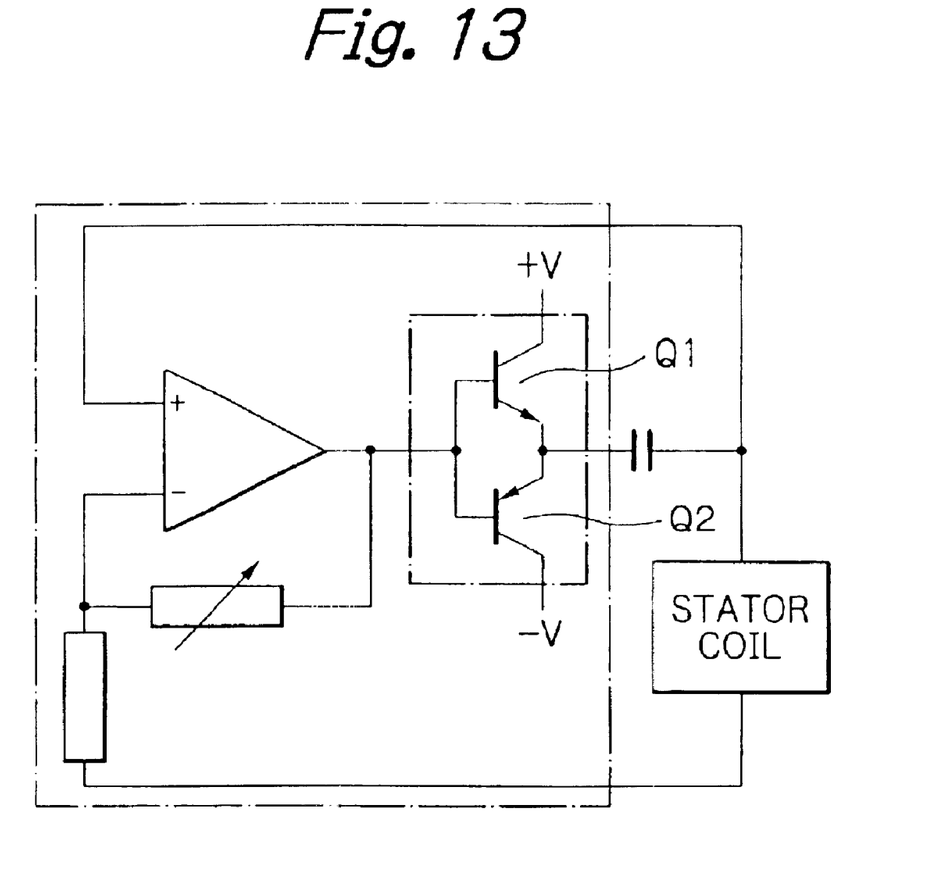
FIG. 13 is a block diagram of a conventional example of prior art.

To drive many of the vibrators used in a manner mode of conventional cellular phones eccentric motors are employed. Recently, however, attention has been paid to vibrators for cellular phones that employ a linearly oscillatory actuator without bearings, and which utilize resonance. U.S. Pat. No. 6,133,701 "DRIVING CIRCUIT FOR OSCILLATORY ACTUATOR" describes a driving device in which a self-resonance frequency of a linearly oscillatory actuator is utilized to generate a driving signal. As shown in FIG. 13, this driving device is based on an analog method in which analog positive feedback is provided to a power amplifier to induce self-oscillation, thus driving a driving coil of the oscillatory actuator (referred to as a "stator coil"), in the neighborhood of the self-resonance frequency.

Further, Japanese Patent Laid-Open No. 8-331826 or 2001-128487 discloses a technique of pulling a driving frequency into a neighborhood of the resonance frequency of the oscillatory actuator. In this technique, however, an exclusive oscillation sensor needs to be provided separately from the driving coil.

The conventional driving device for the oscillatory actuator that causes self-oscillation (U.S. Pat. No. 6,133,701) requires a large capacitor that is difficult to integrate, and the device cannot properly maintain stable self-oscillation if the circuit actuator itself has a low quality factor Q. Further, a driving force increases very slowly when operation commences, thus requiring a long period of time in which to establish steady-state oscillation. Furthermore, the use of a square wave for a driving force results in low power efficiency.

In contrast to the prior art, the present invention does not require the use of a large capacitor, which hinder integration, and enables oscillation to continue even in a case that the actuator itself has a low quality factor Q. Further, the present invention allows driving force to rise quickly at the start of operation. Furthermore, in the present invention only a short time is required in which to establish steady-state oscillation; still further, since intermittent driving is employed, high power efficiency can be achieved.

The device that pulls the driving frequency into the neighborhood of the resonance point (Japanese Patent Laid-Open No. 8-331826) also controls a power supplied to a coil of a magnet on the basis of an output from a detecting means for detecting at least one of displacement, speed, and acceleration of a moving element. However, a drawback of this device is that it requires a sensing member used for detecting such components to be provided separately, which results in a complicated structure.

Further, Japanese Patent Laid-Open No. 2001-128487 discloses an oscillatory linear actuator for determining a frequency of a supplied current pulse on the basis of the result of detection of a natural oscillation of a spring oscillation system. However, using this technique, an amplitude value of the oscillation is detected as a physical quantity, and the frequency of a point with the largest amplitude value is set as driving frequency.

Further, claim 8 of Japanese Patent Laid-Open No. 2001-128487 describes an "oscillatory linear actuator (according to any one of claims 1 to 7), wherein a value for a natural frequency is determined in the absence of supply of a current to the coil". However, in this invention, the "means for detecting the natural frequency" is also provided separately from the driving coil. As has been described, in the conventional art either a large capacitor or a large number of terminals for integration are required, which makes it impossible to provide an inexpensive integrated circuit for a driving circuit.

The present invention utilizes an electromotive force of a driving coil of an oscillatory actuator to detect a natural resonance frequency, thereby enabling an actuator having a simple and inexpensive structure to be provided.

In the present inventions, since a time ratio of polarities of an electromotive force is used to detect an electromotive force instead of an amplitude value, only two amplitude values, H and L (high, low) are required, thereby enabling a digital process to be utilized by means of a simple and inexpensive integrated circuit. Further, in the present invention a flyback pulse caused by residual inductance or the like, and which could adversely affect operation, has a high but narrow amplitude. Consequently, in the device of the present invention, no substantial adverse affects are caused by a flyback pulse. Further, in the present invention (as recited in claims 1–4), no external elements are required to realize the integrated circuit. Consequently, a number of terminals used in the integrated circuit can be significantly reduced.

SUMMARY OF THE INVENTION

As explained in the foregoing, the present invention solves the problems of the prior art by providing a driving device for an oscillatory actuator (as set forth in claim 1) that is able to detect an electromotive force of an oscillatory actuator, while a driving current for intermittent driving is interrupted. The oscillatory actuator is driven by using an FLL (Frequency Locked Loop) to control an oscillation frequency on the basis of a time ratio between positive and negative polarities of an electromotive force which depend on the deviation of the actuator from its self-resonance frequency. Accordingly, stable pulse driving can be maintained in a self-resonance frequency neighborhood specific to the oscillatory actuator.

Further, in the driving device of the present invention (as recited in claims 1 to 4), a digital FLL is employed, which enables almost all of its processes to be executed by a digital circuit.

The invention of claim 5 relates to a VCO (Voltage Controlled Oscillator) that is able continuously vary a frequency by using a low pass filter, to thereby remove alternating current components from a control signal. This oscillator uses an analog FLL as a control method but operates in substantially the same manner as the oscillator described above.

As stated, the present invention enables oscillation to be stably maintained regardless of the existence of a low quality factor Q. In fact, the present invention is characterized in that a relatively low Q has the effect of enlarging a frequency pull range, thus making it easier to absorb variations in the natural frequency of the oscillatory actuator.

BRIEF DESCRIPTION OF THE DRAWINGS

FIG. 8 shows examples of configurations of a controlled oscillator wherein FIG. 8A shows an example in which a capacitor of the oscillator is switched, FIG. 8B shows an example that uses a built-in oscillation circuit and a frequency divider, and FIG. 8C shows an example that uses an external reference clock and a frequency divider;

DETAILED DESCRIPTION OF THE PREFERRED EMBODIMENTS

The present invention will be described below with reference to the accompanying drawings. First, a driving circuit for a typical oscillatory actuator will be described.

Figure 1:
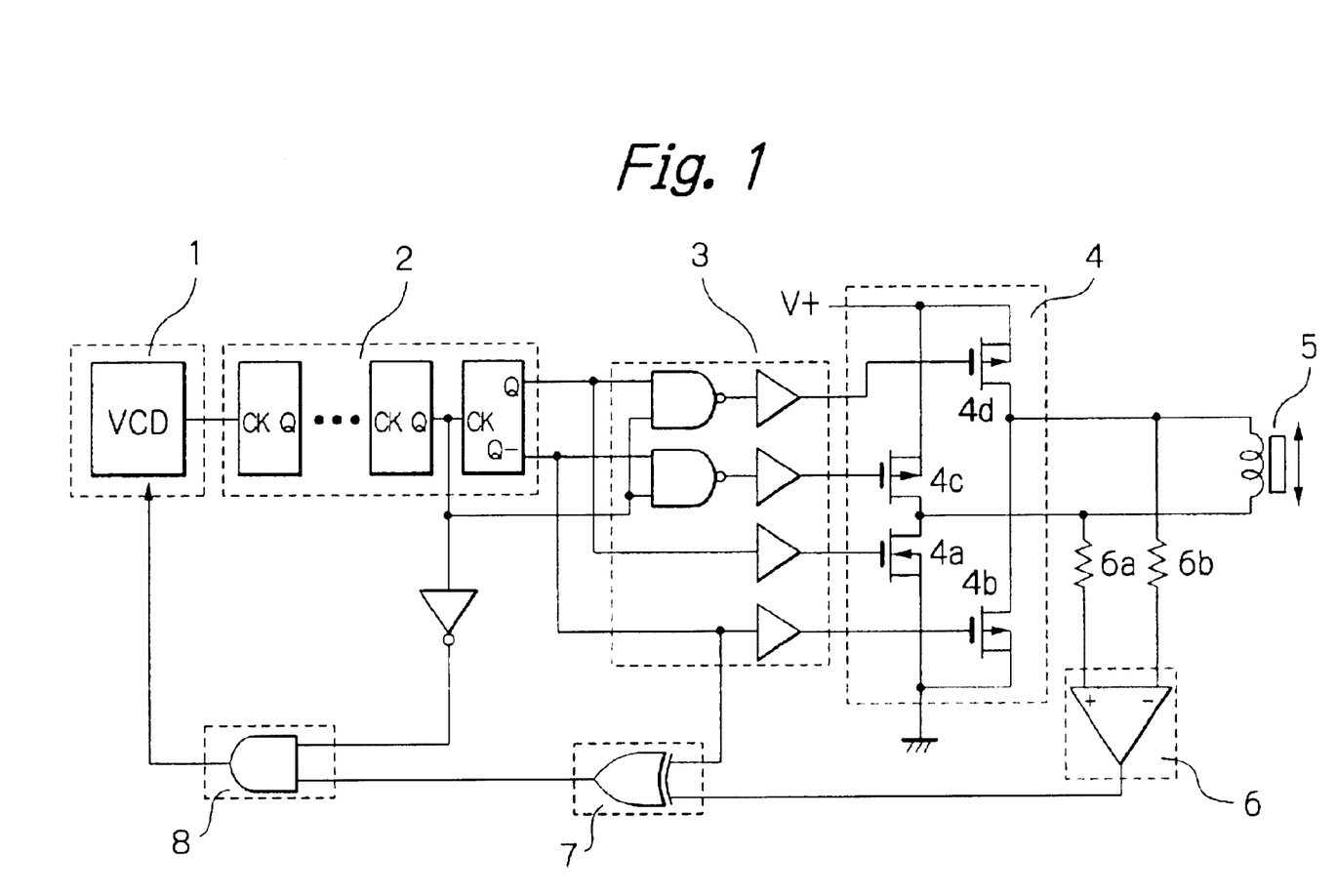
FIG. 1 is a block diagram showing a typical embodiment of the present invention.

FIG. 1 is a block diagram of a typical embodiment of the present invention. An output of a controlled oscillator 1 is connected to a frequency divider 2. A final Q output and Q-output of the frequency divider 2 are connected to a waveform shaping circuit 3 and then to a gate electrode of each MOS transistor in a driving circuit 4 via a buffer in the waveform shaping circuit 3. However, the buffer is not necessarily required if a NAND gate of the waveform shaping circuit 3 or the final Q output and Q-output of the frequency divider 2 has a high driving capability.

Interconnected drain electrodes of MOS transistors 4a and 4c and interconnected drain electrodes of MOS transistors 4b and 4d are connected to a driving coil terminal of an oscillatory actuator 5. The driving coil terminal is connected to an input of an electromotive force detecting circuit 6 via protective impedance elements 6a and 6b. The electromotive force detecting circuit 6 is composed of a comparator or the like which has a differential input terminal that can operate with an input close to a ground potential and a rail-to-rail output terminal that can fully swing a power voltage. The electromotive force detecting circuit 6 converts an input analog signal into a binary digital signal.

An output of the electromotive force detecting circuit 6 is connected to one input of a polarity reversing circuit 7 composed of, for example, an exclusive OR gate. A pulse synchronizing with the final Q-output of the frequency divider 2 is provided to the other input of the polarity reversing circuit 7.

An output of the polarity reversing circuit 7 is connected to one input of an extracting circuit 8 composed of an AND gate. A signal synchronizing with a clock signal input to the final stage of the frequency dividing circuit 2 is provided to the other input of the extracting circuit 8. This input of the extracting circuit 8 has a polarity such that the extracting circuit 8 is closed while electricity is moving through the driving circuit 4. The polarity reversing circuit 7 and the extracting circuit 8 may be connected together in reverse order.

An electrically equivalent circuit of the oscillatory actuator 5 is generally a parallel resonant circuit. Series impedance due to an inductance of the coil of the oscillatory actuator 5 or the like add to the equivalent circuit.

However, an equivalent impedance will be resonated at a frequency much higher than that of the parallel resonance frequency, so this impedance is negligible when the neighborhood of the parallel resonance frequency is analyzed.

Figure 2:
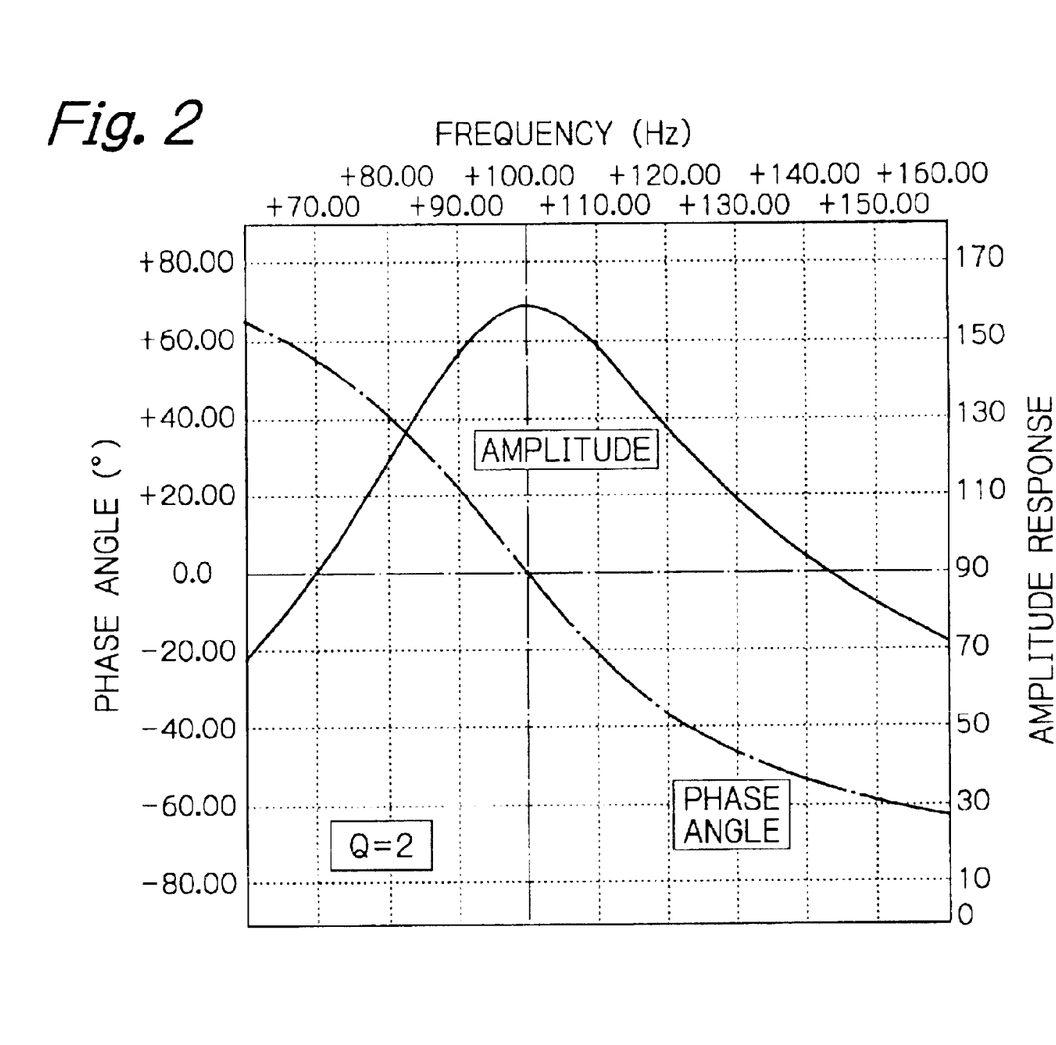
FIG. 2 shows an amplitude response and a phase response for a parallel resonance circuit.

FIG. 2 shows an amplitude and phase characteristics exhibited if the parallel resonance frequency is 100 Hz, the quality factor Q is 2, and the parallel resonance circuit is driven by a current. At the resonance point, the voltage, that is the phase of the electromotive force, is zero. This figure indicates that the voltage phase of electromotive force generated in the driving coil of the oscillatory actuator matches the phase of a driving signal, as shown in FIG. 3.

Figure 3:
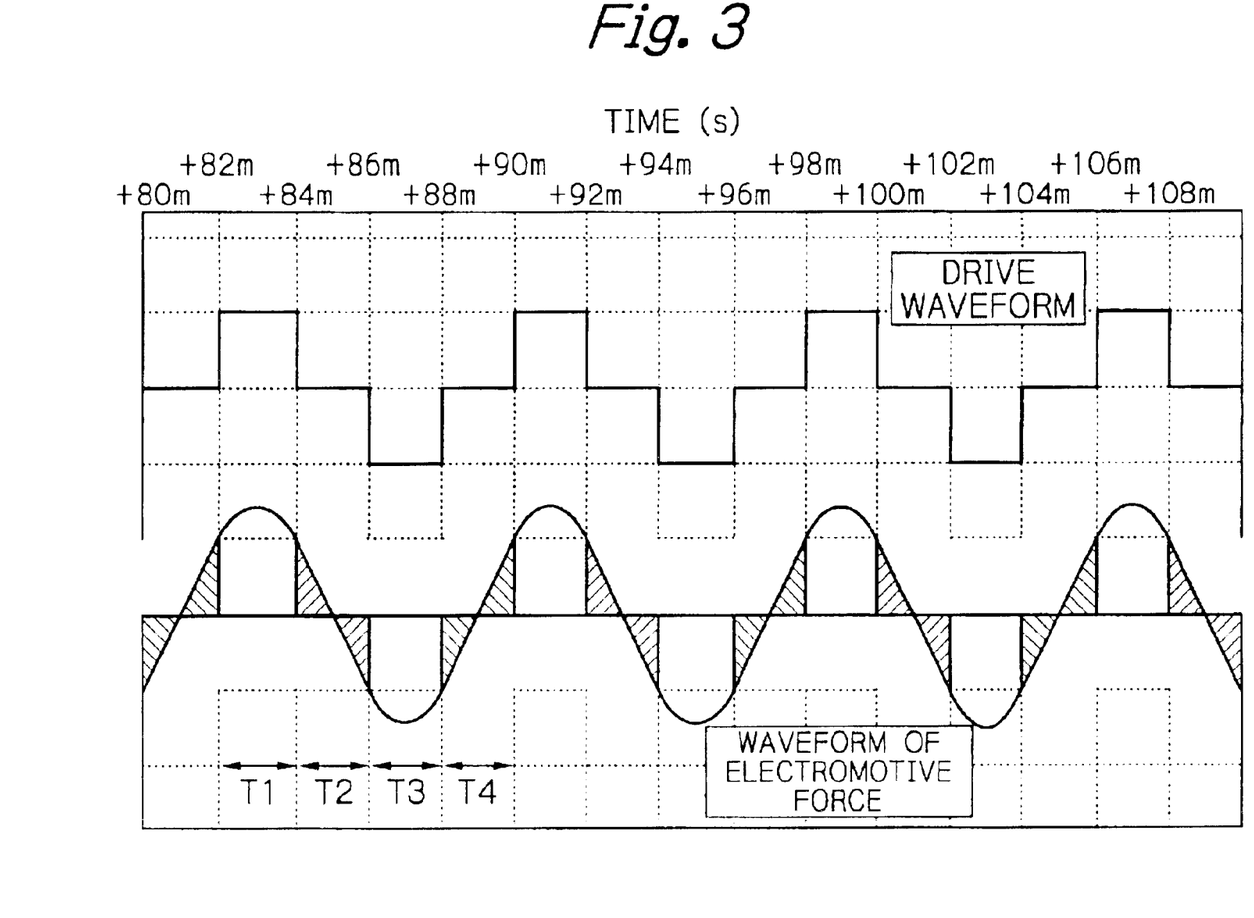
FIG. 3 shows a waveform of a driving current and a waveform of an electromotive force observed when a driving frequency coincides with a self-resonance frequency of an oscillatory actuator.

As denoted by the shaded areas in FIG. 3, the time ratio of polarities of electromotive force detected while no driving signals are being output is 50%. In FIG. 3, a quarter of a driving period located on a positive side of the driving waveform is defined as T1. Subsequent quarter periods are defined as T2, T3, and T4, respectively. During the periods T2 and T4, the characteristic of the electromotive force changes from positive to negative, and then back to positive, and the rate is substantially 50%.

Figure 4:
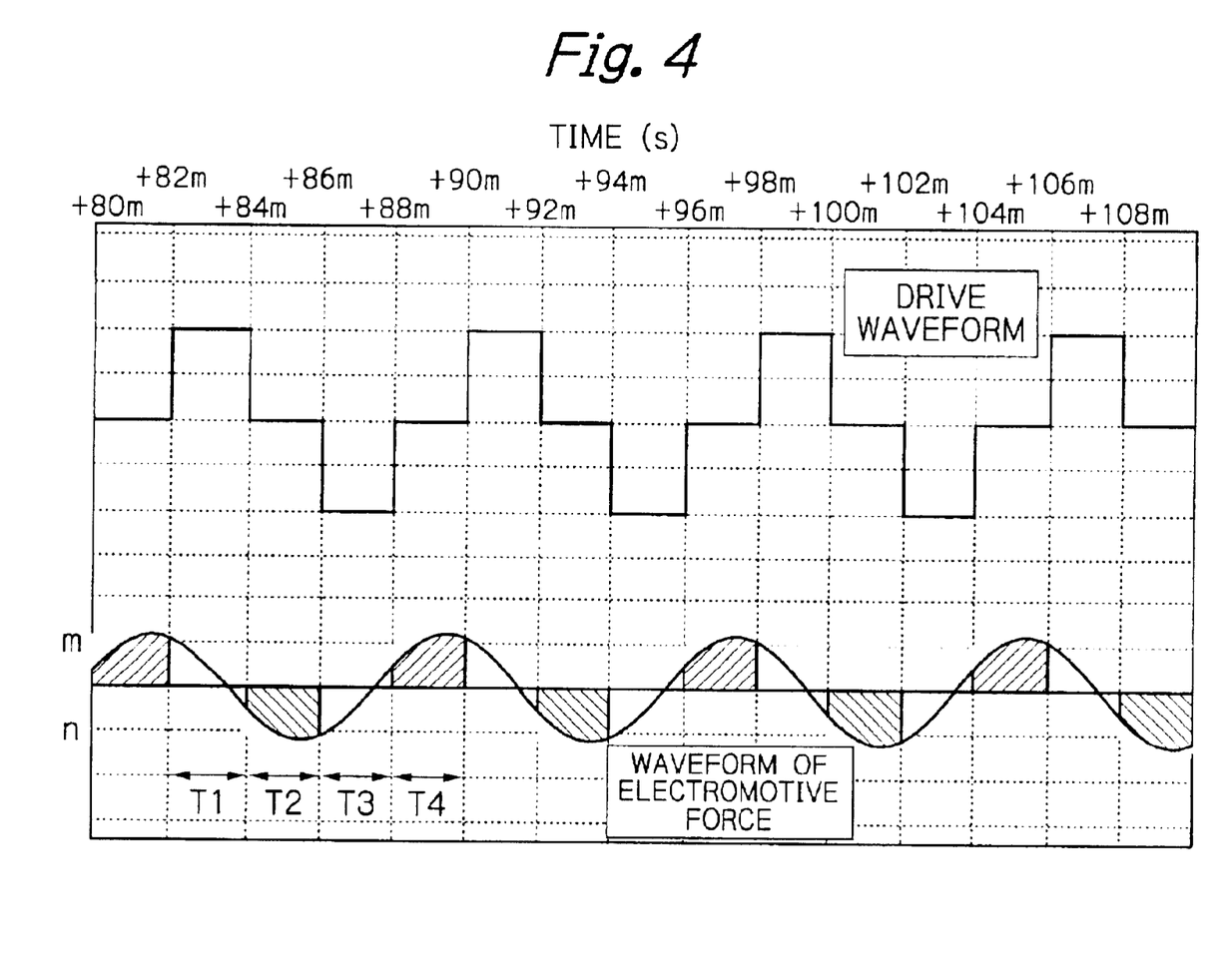
FIG. 4 shows the above waveforms observed when the driving frequency is lower than the self-resonance frequency of the oscillatory actuator.

When a driving operation is performed with a frequency lower than the resonance point, the parallel resonance circuit is inductive and the phase of the electromotive force leads that of the waveform of a driving current. That is, the phase of voltage of the electromotive force generated in the driving coil of the oscillatory actuator leads than the phase of the driving current. As denoted by the shaded areas in FIG. 4, the polarity of the electromotive force detected while no driving signals are being output increases a polarity ratio opposite to polarity of the just preceding driving voltage. That is, a negative ratio increases during the period T2, whereas a positive ratio increases during the period T4.

Figure 5:
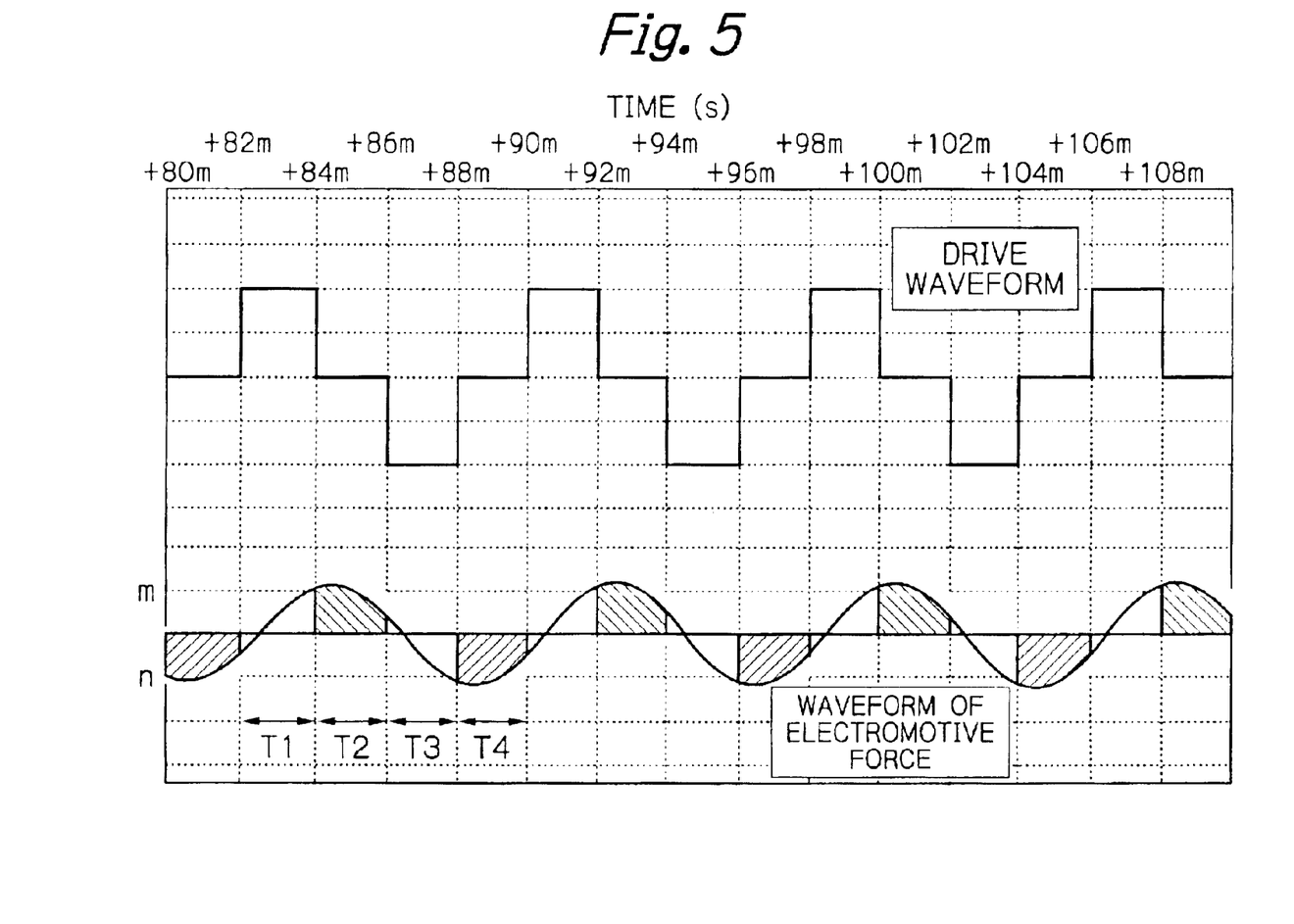
FIG. 5 shows the above waveforms observed when the driving frequency is higher than the self-resonance frequency of the oscillatory actuator.

If the driving operation is performed at a frequency higher than the resonance point, the parallel resonance circuit becomes capacitive and the phase of the electromotive force lags that of the waveform of the driving current. That is, the phase of voltage of the electromotive force generated in the driving coil of the oscillatory actuator lags the phase of the driving current. As denoted by the shaded areas in FIG. 5, the polarity of the electromotive force detected while no driving signals are being output increases a polarity ratio of the same polarity that of as the just preceding driving voltage. That is, the positive rate increases during the period T2, whereas the negative ratio increases during the period T4.

Accordingly, an output from the electromotive force detecting circuit 6 is passed through the polarity reversing circuit 7, which controls and reverses the polarity synchronously with the driving voltage from the driving circuit 4.

Then, the extracting circuit 8 is used to extract only signals that are output during the periods T2 and T4. Thus, it is possible to detect the direction in which the driving frequency deviates from the self-resonance frequency of the oscillatory actuator 5, on the basis of the ratio of H and L, i.e. the logic level of an output from the extracting circuit 8. By using this detection signal to control the time ratio of two frequencies of the controlled oscillator 1, the driving frequency can be pulled to the neighborhood of the self-resonance frequency of the oscillatory actuator 5. This control method is called a "digital FLL".

Figure 6:
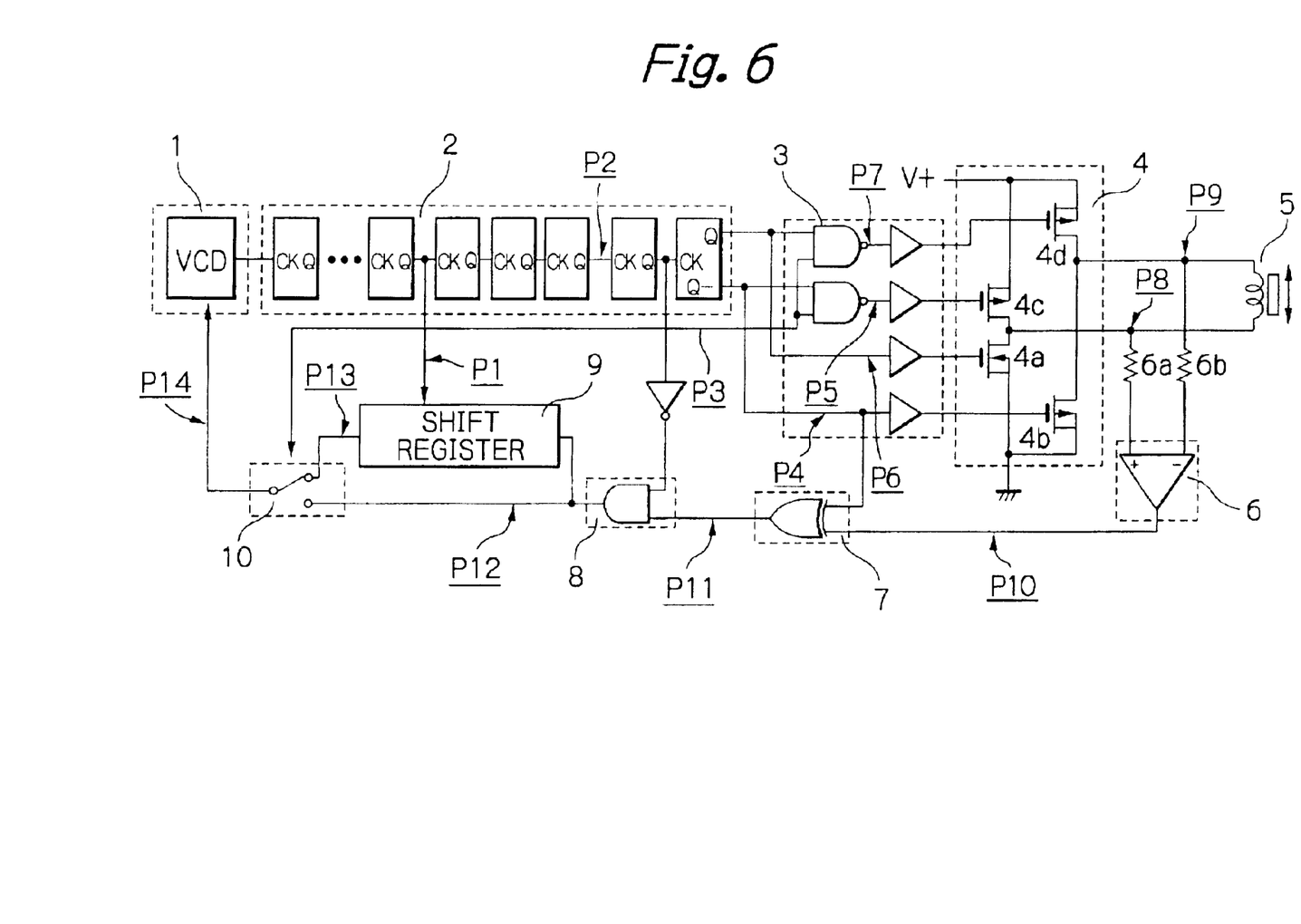
FIG. 6 shows another embodiment of the present invention.

FIG. 6 shows an embodiment in which the system in FIG. 1 is further improved. In this embodiment, a delay circuit 9 and a switching circuit 10 are added to the basic device in FIG. 1. The reference numerals in FIG. 6 are the same as those used in FIG. 1, and their corresponding descriptions are therefore omitted.

Two inputs of the switching circuit 10 are connected to an input and an output of the delay circuit respectively. An output of the switching circuit 10 is connected to a frequency selection input of the controlled oscillator 1. A switching control signal synchronizes with a clock input to the final stage of the frequency divider 2. This control signal has a polarity such that an output from the delay circuit 9 acts as a control signal for the controlled oscillator 1 when the oscillatory actuator 5 is driven.

For example, the delay circuit 9 is composed of a shift register to provide a time delay corresponding to a quarter period of the driving frequency of the driving circuit 4. Selection of a clock that provides the delay will be described below in detail.

A clock supplied to the shift register of the delay circuit 9 synchronizes with a clock input to the (n+2)-th flip flop from the final one of the frequency dividing circuit 2 when the number of stages of the shift register is the n-th power of 2. If the number of shift register stages is $8=2^3$, then n+2=5, and this clock synchronizes with a clock input to the fifth flip flop from the final one of the frequency dividing circuit 2 as shown in the figure.

If the number of shift register stages is $16=2^4$, then n+2=6, and this clock synchronizes with a clock input to the sixth flip flop from the final one of the frequency dividing circuit 2, as shown in the figure. With an increase in number of shift register stages, a number of elements increases, but the accuracy of a complementary signal also increases. This helps reduce the amount of jitter in a driving signal sent to the oscillatory actuator 5. The polarity reversing circuit 7 and the extracting circuit 8 may be connected together in reverse order.

Figure 7:
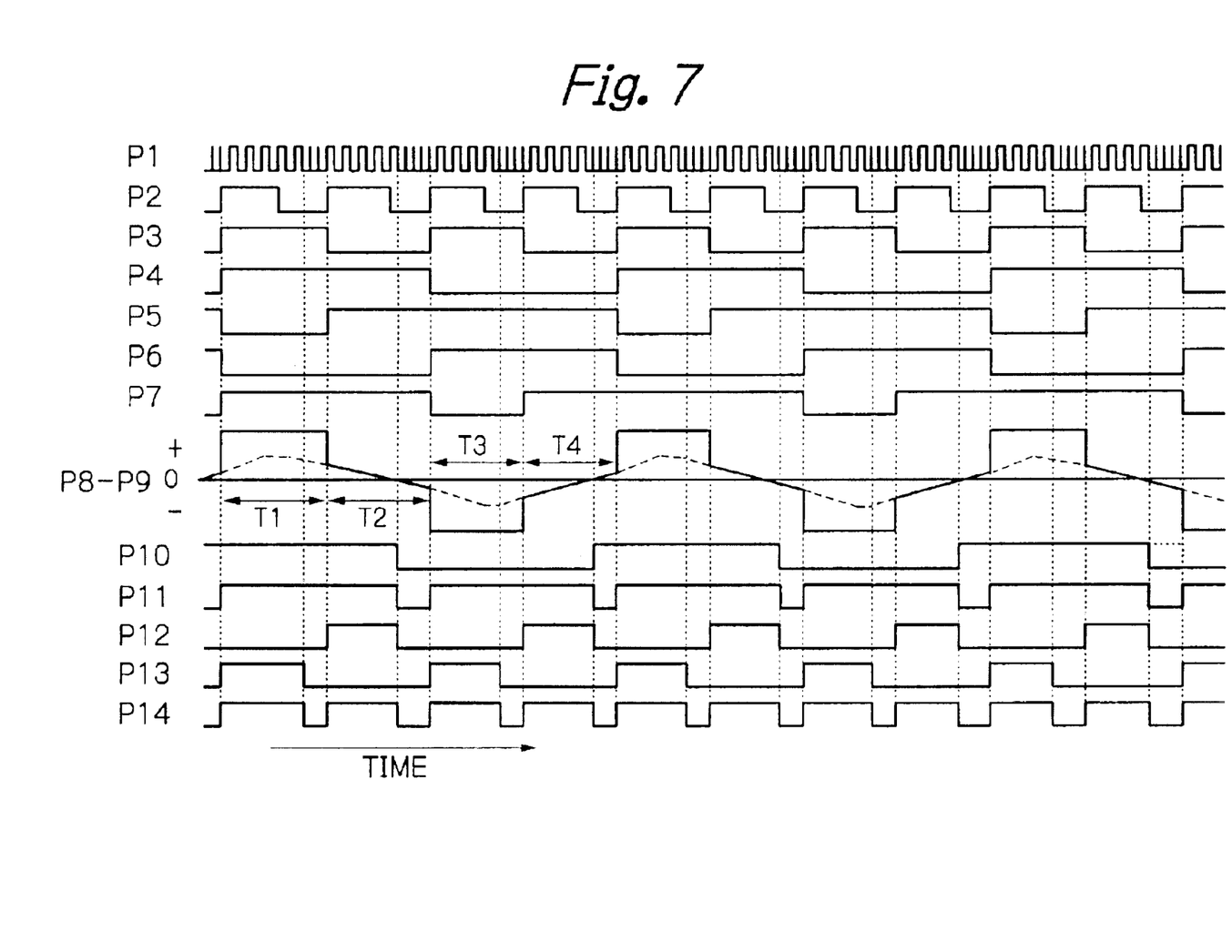
FIG. 7 is a timing diagram for the embodiment in FIG. 6.

FIG. 7 is a timing diagram illustrating the embodiment shown in FIG. 6. A logic signal P1 at the top is one of the outputs from the controlled oscillator 1 in FIG. 6, i.e. a clock supplied to the shift register constituting the delay circuit 9. Reference character P2 denotes a clock signal input to the stage preceding the final one of the frequency divider 2. Reference character P3 denotes a clock signal input to the final stage of the frequency divider 2. Reference character P4 denotes a Q-output from the final stage of the frequency divider 2. Reference characters P5 and P7 denote signals that drive gates of the P channel MOS transistors 4d and 4c. Reference characters P6 and P4 denote signals that drive gates of the N channel MOS transistors 4a and 4b. Reference numerals P8 and P9 denote the driving coil terminal of the oscillatory actuator 5. In the timing diagram, the waveform of the voltage across the driving coil terminal is shown as P8–P9, using an analog value.

Reference character P10 denotes an output from the electromotive force detecting circuit 6. Reference character P11 denotes an output from the polarity reversing circuit 7. The output P11 controls the signal P10 so as to reverse or maintain the signal P10 according to the logic level P4. Reference character P12 denotes an output from the extracting circuit 8 which opens the gate during the periods T2 and T4 to extract required information from the input P11. Further, reference numeral P12 denotes an input to the shift register constituting the delay circuit 9. Reference character P13 denotes an output from the shift register constituting the delay circuit 9. Reference character P14 denotes an output signal from the switching circuit 10 which input also to a control input to the controlled oscillator 1. The output frequency of the controlled oscillator 1 is switched to a high or low level in accordance with the logic level of the control input signal P14, i.e. H or L.

Figure 8:
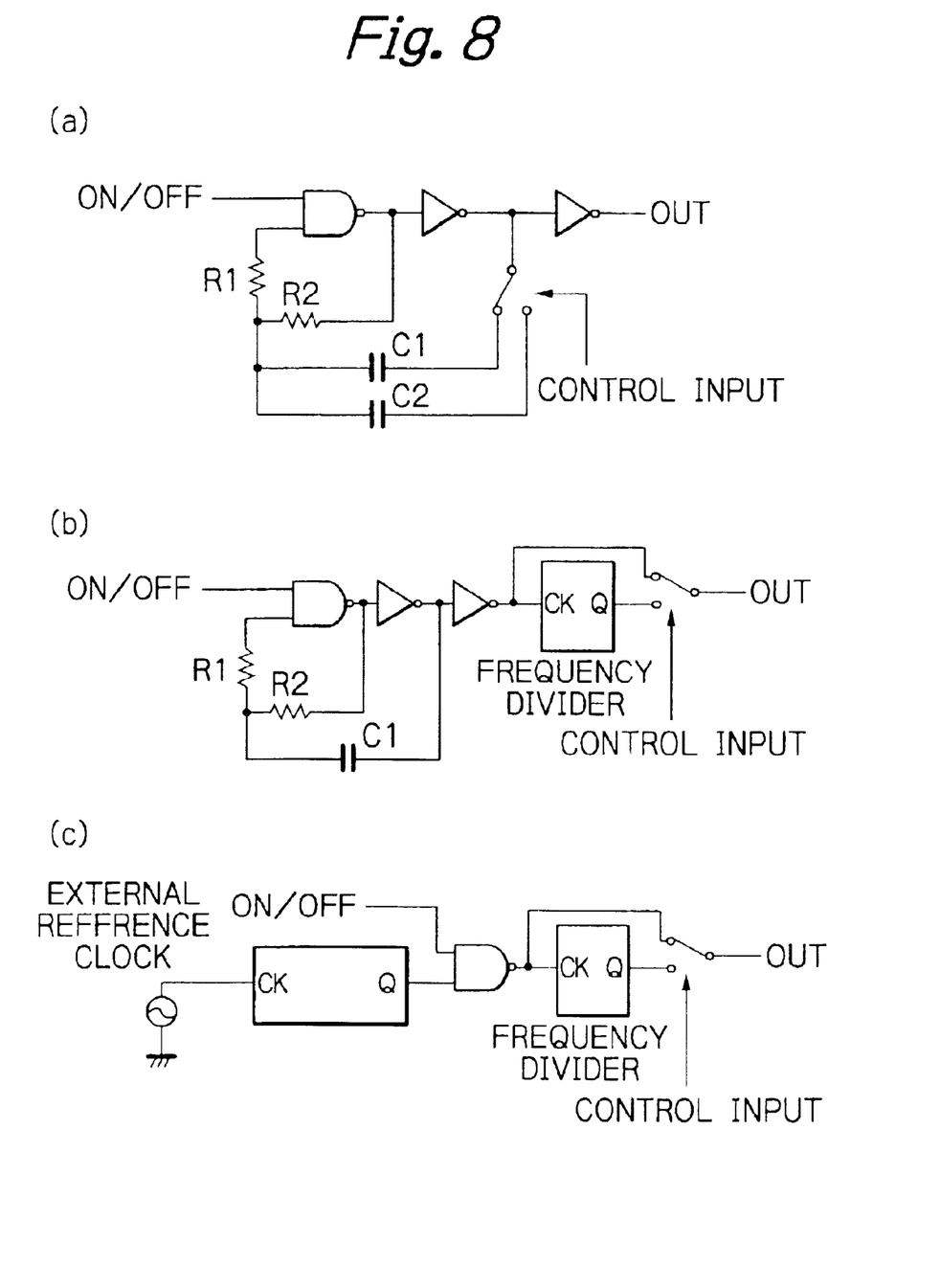

FIG. 8 shows an embodiment of the controlled oscillator 1. FIG. 8A shows an embodiment in which the capacitance C of a CR oscillation circuit using a logic gate is switched to C1 or C2 to switch an oscillation frequency. FIG. 8B shows an embodiment using a fixed oscillator and a frequency divider. The present method is characterized by enabling a frequency ratio to be accurately set because of switching output frequency such a way through the frequency divider or pass the frequency divider based on the control input.

This type of controlled oscillator using a frequency divider has, if the frequency divider has n stages, a frequency ratio of $2^n$. For example, for n=2, the controlled oscillator has a frequency ratio of $2^2$, i.e. 4.

FIG. 8C shows an embodiment utilizing an external reference frequency clock. the external clock is divided by a frequency divider having an appropriate frequency division ratio to create a clock signal of a required frequency. Then, this clock signal is used in place of the fixed oscillator in FIG. 8B. When the present device is incorporated in a large-scale system LSI, the technique described is very effective because it does not require the use of exclusive oscillators, and also improves accuracy.

Figure 9:
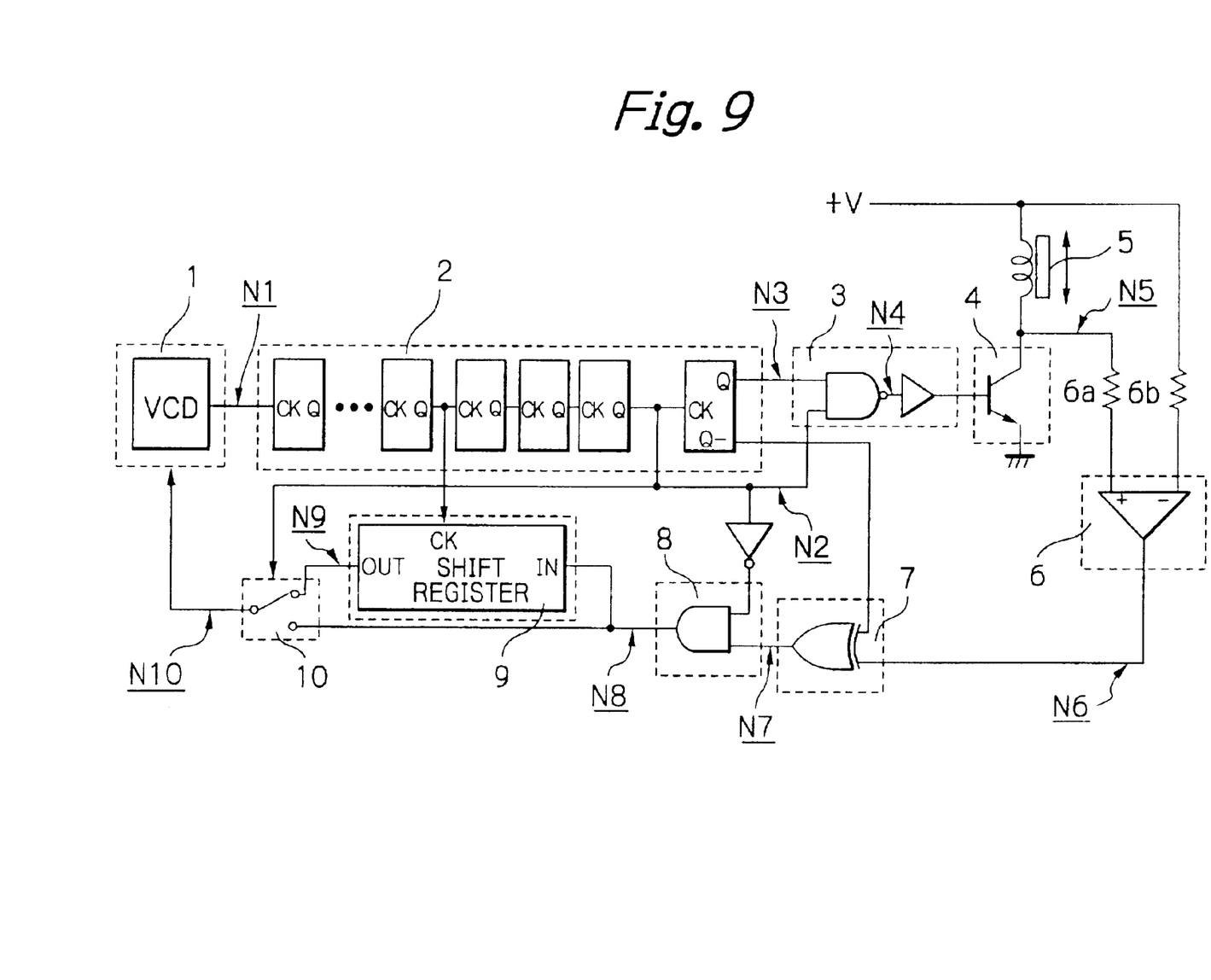
FIG. 9 shows another embodiment of the present invention based on a single driving operation.

FIG. 9 shows another embodiment of the present invention. This embodiment is characterized in that a single drive circuit is used. Since the oscillatory actuator carries out driving once per period, this embodiment provides a weaker driving force but has a simpler configuration, and requires only one power transistor, thus reducing costs.

The components 1 to 10 provide the same functions as those of the components shown in FIG. 1, and are thus denoted by the same reference numerals. The polarity reversing circuit 7 and the extracting circuit 8 may be connected together in reverse order.

Figure 10:
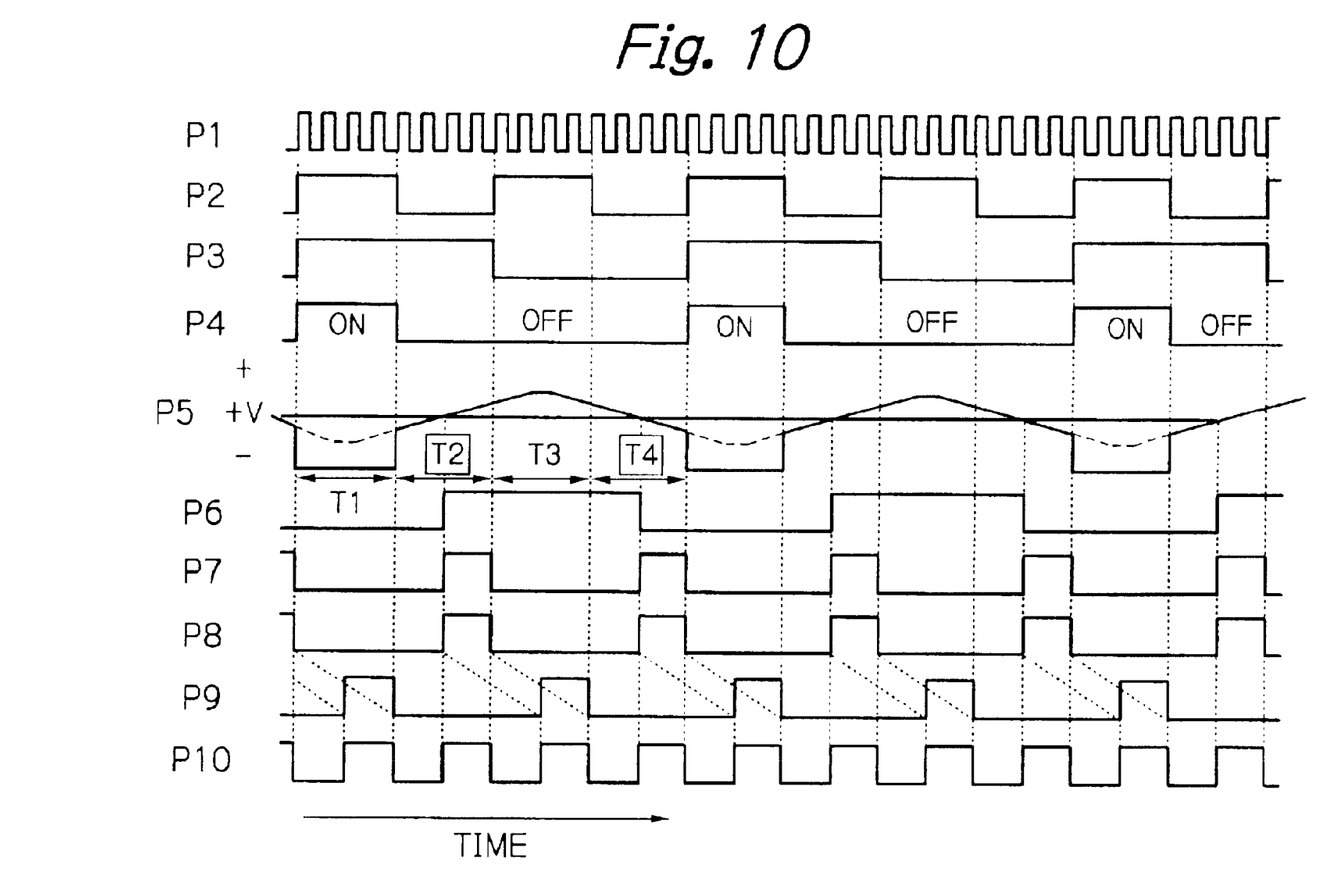
FIG. 10 is a timing diagram for the embodiment in FIG. 9.

FIG. 10 is a timing diagram for the embodiment shown in FIG. 9. Symbols N1 to N10 on the left of the figure indicate signals at circuit node numbers N1 to N10 specified in FIG. 9. Only reference character N5 denotes an analog signal, whereas the other reference characters denote logic signals.

Reference character N1 denotes an output from the controlled oscillator 1. Reference character N2 denotes a clock input to the final stage of the frequency divider 2. Reference character N3 denotes a Q output from the final stage of the frequency divider 2. Reference numeral N4 denotes a driving input to the driving circuit 4. Reference numeral N5 denotes the connection between the driving coil terminal of the oscillatory actuator 5 and a collector or drain terminal of a transistor constituting the driving circuit 4. Reference numeral N6 denotes an output from the electromotive force detecting circuit 6. Reference numeral N7 denotes an output from the polarity reversing circuit 7. Reference numerals N8 and N9 denote an input to and an output from the delay circuit 9 respectively. Reference numeral N10 is an output from the switching circuit 10 which is also a control input to the controlled oscillator 1.

The timing diagram in FIG. 10 indicates an open loop configuration obtained by cutting the control input N10 to the controlled oscillator 1 off from the controlled oscillator 1. This makes the period of N1 constant so as to facilitate viewing of the timing diagram.

The waveform of the signal N5 in FIG. 10 is electrically open during all periods, other than the driving periods, to generate an electromotive force across the driving coil of the oscillatory actuator 5 as a result of the self-oscillation of the oscillatory actuator 5.

When the self-resonance frequency of the actuator is reached, the phase of the electromotive force substantially coincides with the phase of the driving signal. As a result, a sine electromotive force is observed as shown by N5. During driving, the electromotive force is hidden by the driving signal, as denoted by the dotted part of the signal N5. However, during other periods, the electromotive force can be detected as it is.

To correctly control the frequency, the driving waveform N4 of the driving circuit 4 has a duty ratio of about a quarter and is thus narrow, as shown in FIG. 10. One period is divided into four quarters T1, T2, T3, and T4 as shown in FIG. 10. In this case, the electromotive force detecting circuit 6 detects an electromotive force, and the polarity reversing circuit 7 alternately reverses the polarity. Then, the extracting circuit 8 extracts only the detection signals from the periods T2 and T4.

The switching circuit 10 selects the signal N8 for the periods T2 and T4, the signal N8 not being passed through the delay circuit 9, and selects the signal N9 for the periods T1 and T2, the signal N9 having passed through the delay circuit 9. Thus, during each of the periods T1 and T2, in which no electromotive force is detected, a signal present in a quarter period before the period T1 or T2 is reused. This serves to enlarge a pulling frequency range, while maintaining substantially constant the duty ratio of the driving waveform N4 after pulling. In simplified form, the delay circuit 9 and the switching circuit 10 may be omitted. In such a case, the duty ratio may change depending on the pulling condition.

Figure 11:
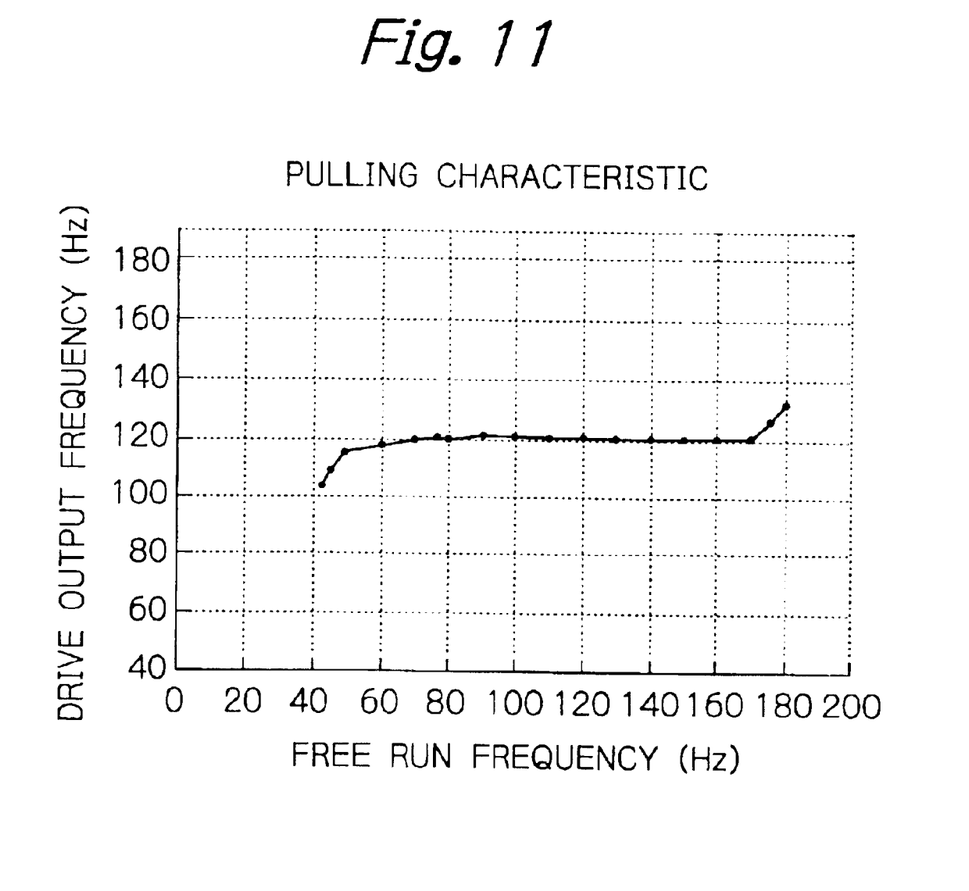
FIG. 11 is a graph showing a frequency pulling characteristic of a present experimental device in FIG. 6.

FIG. 11 is a graph showing a frequency pulling characteristic of an experimental device based on FIG. 6. An oscillatory actuator used has a self-resonance frequency of about 120 Hz and a quality factor Q of about 2. The controlled oscillator 1 is based on the method shown in FIG. 8B. The frequency ratio of the two frequencies is 4, and the delay circuit 9 is an 8-stage shift register.

Although generation of a free run frequency is not shown, a switching signal is supplied from P2 to the control input of the controlled oscillator 1 to alternately switch the two frequencies in a fixed manner to vary the original oscillation frequency of the controlled oscillator. This variation is measured. And the result of the measurement, it can be seen that a capability of pulling a very wide range of free-run frequencies from about 50 to 170 Hz is able to be achieved.

Figure 12:
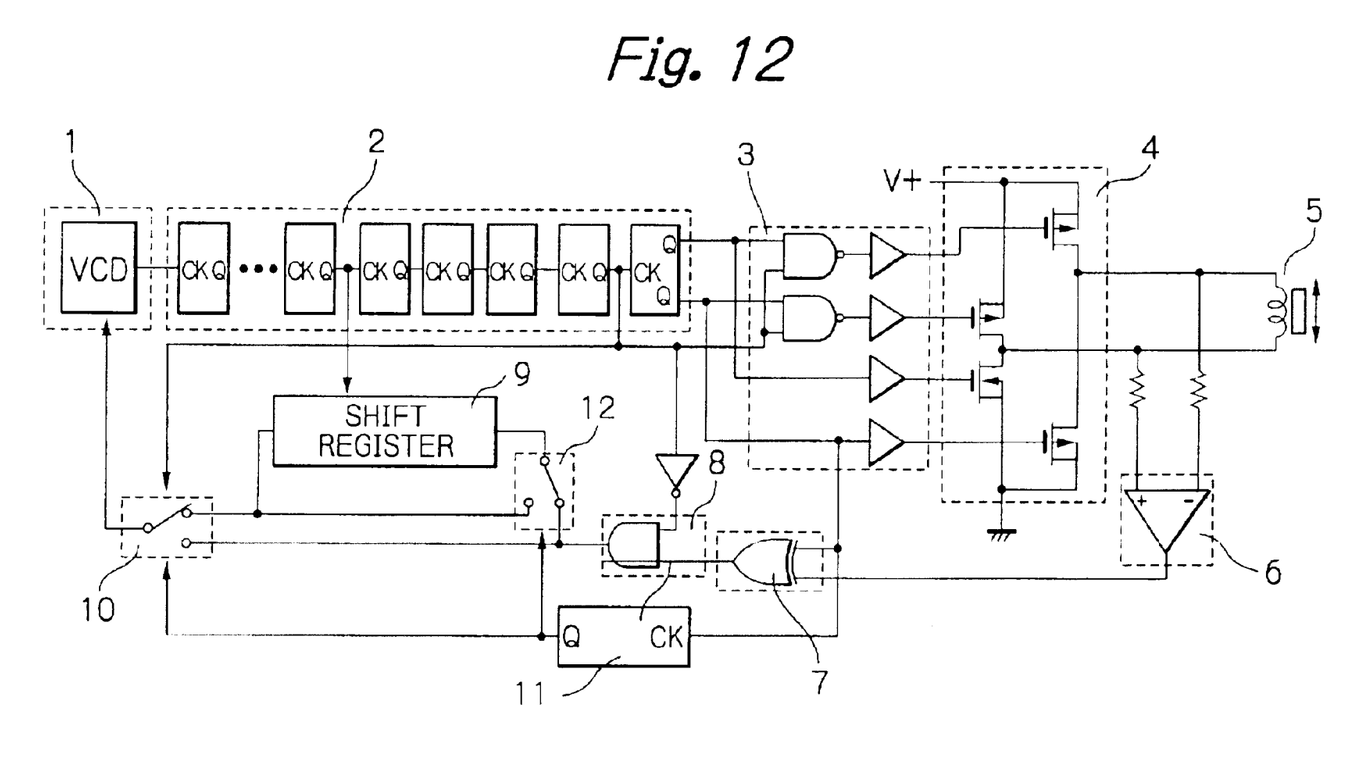
FIG. 12 shows another embodiment of the present invention which reduces an amount of jitter in a driving signal.

FIG. 12 shows another embodiment in which an amount of jitter in the driving signal is reduced. In this embodiment, a counter 11 and a switching circuit 12 are added to the embodiment in FIG. 6, and the switching circuit 10 is provided with an additional control input. The reference numbers in the other blocks are the same as those used in FIG. 6, and thus their corresponding descriptions are omitted.

In this embodiment, the counter 11 counts driving signals. When oscillation is stabilized after a plurality of periods, the switching circuit 12 at the input of the shift register is switched to the output of the shift register to allow circulation of a quarter period of information stored in the delay circuit 9. Furthermore, the switching circuit 10 is fixed to the output of the shift register. Then, a feedback operation performed by the FLL is interrupted to provide a driving signal of a fixed period. Information may be stored in another storage means such as a RAM instead of using the shift register.

By setting a count in the counter 11 so that this fixed read state is entered after driving has been started and oscillation has been stabilized, a longitudinal variation in the natural resonance frequency of the oscillatory actuator or a variation in temperature can be accommodated so as to reduce an amount of jitter.

The present invention can utilize an oscillatory actuator having a smaller number of parts and a simpler structure than that of a conventional eccentric motor. The oscillatory actuator is productive partly due to an absence of bearings; and a solder reflow operation can be utilized to install the actuator on a printed circuit board. Thus, the oscillatory actuator can be produced inexpensively.

Further, even if the oscillatory actuator has a relatively low quality factor Q, a present driving device for the oscillatory actuator can maintain driving in a natural neighborhood frequency, thereby helping to accommodate variations in natural resonance frequencies attributable to differences among individual actuators as a result of manufacture. Therefore, the actuator main body is productive and can be manufactured inexpensively.

Furthermore, in contrast to the conventional self-oscillating type which rises slowly upon activation and fails to enter a steady-state oscillation state within a short time, the present invention requires only a short time to effect a rise upon activation.

Moreover, the conventional art requires a large number of external parts, whereas in the present invention most processes can be executed by means of a logic circuit, thus enabling the use of an integrated circuit. Further, since the pulling frequency range is very wide, an oscillation frequency accuracy need not be high. As a result the oscillation circuit can be easily incorporated into an integrated circuit. Thus, use of the present device enables an integrated circuit to be utilized that does not require adjustment, and which further does not require the use of any external parts.

Further, since the polarity reversing circuit is provided at the output of the electromotive force detecting circuit 6, the present invention is also able to effectively cancel an input offset of the comparator constituting the electromotive force detecting circuit 6. Consequently, it is not necessary for the elements employed to be highly accurate in operation.

What is claimed is:

1. A driving device for an oscillatory actuator, comprising:
   a controlled oscillator;
   a frequency dividing circuit that divides the frequency of an output from said controlled oscillator;
   a waveform shaping circuit that shapes an waveform output from said frequency dividing circuit;
   an intermittent driving circuit that intermittently and differentially drives said oscillatory actuator on the basis of an output of said waveform shaping circuit;

an electromotive force detecting circuit that detects a polarity of an electromotive force generated across a driving terminal of said oscillatory actuator;

a polarity reversing circuit that controls and reverses the polarity of an output signal of said electromotive force detecting circuit synchronously with the driving period of said intermittent driving circuit; and an extracting circuit that extracts an output signal of said polarity reversing circuit only at a time that said intermittent driving circuit is not operating, said polarity reversing circuit and said extracting circuit being connected between an output of said electromotive force detecting circuit and a control input of said controlled oscillator wherein by selecting an oscillation frequency for said controlled oscillator on the basis of an extracted output logic level of said electromotive force detecting circuit, the frequency of an intermittent driving output is automatically pulled to a neighborhood of a self-resonance frequency of said oscillatory actuator.

2. The driving device for an oscillatory actuator according to claim 1, further comprising a delay circuit that delays an output from said electromotive force detecting circuit by about a quarter period of the intermittently driving cycle, the output being detected while said intermittent driving circuit is not providing a driving current, wherein during a period in which said intermittent driving circuit is carrying out driving, an output from said delay circuit is used as a control input to said controlled oscillator, and a pulling frequency range is increased while maintaining substantially constant a duty cycle of the output from said intermittent driving circuit.

3. The driving device for an oscillatory actuator according to claim 2, wherein said controlled oscillator is a controlled oscillator that is capable of continuous frequency control, and a low pass filter is provided with said control input of said controlled oscillator.

4. The driving device for an oscillatory actuator according to claim 2, further comprising a circuit that stores an output signal from said electromotive force detecting circuit, said output signal being detected while said intermittent driving circuit is not operating, wherein an output from said storage circuit is repeatedly used as a control signal for said controlled oscillator.

5. The driving device for an oscillatory actuator according to claim 1, wherein said controlled oscillator is a controlled oscillator that is capable of continuous frequency control, and a low pass filter is provided with said control input of said controlled oscillator.

6. The driving device for an oscillatory actuator according to claim 5, further comprising a circuit that stores an output signal from said electromotive force detecting circuit, said output signal being detected while said intermittent driving circuit is not operating, wherein an output from said storage circuit is repeatedly used as a control signal for said controlled oscillator.

7. The driving device for an oscillatory actuator according to claim 1, further comprising a circuit that stores an output signal from said electromotive force detecting circuit, said output signal being detected while said intermittent driving circuit is not operating, wherein an output from said storage circuit is repeatedly used as a control signal for said controlled oscillator.

8. A driving device for an oscillatory actuator, comprising:
a controlled oscillator;
a frequency dividing circuit that divides the frequency of an output from said controlled oscillator;
a waveform shaping circuit that shapes an output waveform from said frequency dividing circuit;
an intermittent driving circuit that intermittently and singly drives said oscillatory actuator on the basis of an output from said waveform shaping circuit;
an electromotive force detecting circuit that detects the polarity of an electromotive force generated across a driving terminal of said oscillatory actuator;
a polarity reversing circuit that reverses a polarity of an output signal of electromotive force detecting circuit synchronously with the driving period of said intermittent driving circuit; and
an extracting circuit that extracts an output signal of said polarity reversing circuit only during a first and third quarter of a period in which said intermittent driving circuit is not operating;
said polarity reversing circuit and said extracting circuit being connected between an output of said electromotive force detecting circuit and a control input of said controlled oscillator
wherein by selecting an oscillation frequency for said controlled oscillator on the basis of an extracted output logic level of said electromotive force detecting circuit, the frequency of an intermittent driving output is automatically pulled to a neighborhood of self-resonance frequency of said oscillatory actuator.

9. The driving device for an oscillatory actuator according to claim 8, further comprising a delay circuit that delays a positive and negative polarity signal for electromotive force by about a quarter period of the intermittently driving cycle, the electromotive force being generated across a driving terminal of the oscillatory actuator, and being detected during the first and third quarters of the period in which said intermittent driving circuit is not operating, wherein while said intermittent driving circuit is carrying out driving, and during a second quarter of the period in which said intermittent driving circuit is not operating, an output from said delay circuit is used as an input for controlling said the controlled oscillator, and a pulling frequency range is increased while the duty cycle of the output signal from said intermittent driving circuit is maintained to be substantially constant.

10. The driving device for an oscillatory actuator according to claim 9, wherein said controlled oscillator is a controlled oscillator that is capable of continuous frequency control, and a low pass filter is provided with said control input of said controlled oscillator.

11. The driving device for an oscillatory actuator according to claim 9, further comprising a circuit that stores an output signal from said electromotive force detecting circuit, said output signal being detected while said intermittent driving circuit is not operating, wherein an output from said storage circuit is repeatedly used as a control signal for said controlled oscillator.

12. The driving device for an oscillatory actuator according to claim 8, wherein said controlled oscillator is a controlled oscillator that is capable of continuous frequency control, and a low pass filter is provided with said control input of said controlled oscillator.

13. The driving device for an oscillatory actuator according to claim 8, further comprising a circuit that stores an output signal from said electromotive force detecting circuit, said output signal being detected while said intermittent driving circuit is not operating, wherein an output from said storage circuit is repeatedly used as a control signal for said controlled oscillator.

* * * * *